(12) United States Patent
Zhang et al.

(10) Patent No.: US 12,470,890 B2
(45) Date of Patent: Nov. 11, 2025

(54) METHOD AND MANAGEMENT ENTITY FOR DETERMINATION OF GEOFENCE

(71) Applicant: Telefonaktiebolaget LM Ericsson (publ), Stockholm (SE)

(72) Inventors: Fengpei Zhang, Guangzhou (CN); Baiping Chen, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 289 days.

(21) Appl. No.: 17/924,752

(22) PCT Filed: May 15, 2020

(86) PCT No.: PCT/CN2020/090655
§ 371 (c)(1),
(2) Date: Nov. 11, 2022

(87) PCT Pub. No.: WO2021/227066
PCT Pub. Date: Nov. 18, 2021

(65) Prior Publication Data
US 2023/0188928 A1   Jun. 15, 2023

(51) Int. Cl.
*H04W 4/021* (2018.01)
*H04W 4/02* (2018.01)

(52) U.S. Cl.
CPC ........... *H04W 4/021* (2013.01); *H04W 4/027* (2013.01)

(58) Field of Classification Search
CPC ..... H04W 4/021; H04W 4/027; H04W 4/022; H04W 4/44; G08G 1/096716; G08G 1/096741; G08G 1/096775; G08G 1/207
(Continued)

(56) References Cited

U.S. PATENT DOCUMENTS

| 8,489,127 B2 | 7/2013 | Huang et al. |
| 10,089,868 B1 | 10/2018 | Hayward |

(Continued)

FOREIGN PATENT DOCUMENTS

| CN | 104063509 A | 9/2014 |
| CN | 105737340 A | 7/2016 |

(Continued)

OTHER PUBLICATIONS

European Search Report and Opinion for European Patent Application No. 20935241.8 dated May 30, 2023 (12 pages).
(Continued)

*Primary Examiner* — Hirdepal Singh
(74) *Attorney, Agent, or Firm* — Sage Patent Group

(57) ABSTRACT

A method and a management entity are disclosed for determination of geofence. According to an embodiment, the management entity receives, from an event reporter, a report indicating that an event related to a geofence has occurred at a location. The management entity determines, from a geographic information database, one or more spatial elements related to a spatial range of the geofence, with the reported location of the event. The management entity determines, from the one or more spatial elements, the spatial range of the geofence. At least one of determining the one or more spatial elements and determining the spatial (Continued)

range of the geofence is based on one or more event rules predetermined for the event according to characteristic of the event.

19 Claims, 11 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 10,171,940 B1 | 1/2019 | Greenberger et al. | |
| 10,531,224 B1 | 1/2020 | Lemieux | |
| 2010/0203901 A1 | 8/2010 | Dinoff et al. | |
| 2014/0135039 A1 | 5/2014 | Sartipi et al. | |
| 2017/0098373 A1 | 4/2017 | Filley et al. | |
| 2019/0147736 A1* | 5/2019 | Camp | G08G 1/0133 340/905 |
| 2020/0135022 A1* | 4/2020 | Xu | G08G 1/0141 |
| 2021/0134147 A1* | 5/2021 | Camplejohn | G07C 5/008 |
| 2021/0191407 A1* | 6/2021 | Benisch | G05D 1/0214 |
| 2021/0295675 A1* | 9/2021 | Hesse | G08B 25/10 |
| 2021/0341303 A1* | 11/2021 | Rappel-Kroyzer | G08G 1/0141 |
| 2024/0085191 A1* | 3/2024 | Lu | G05D 1/0257 |

FOREIGN PATENT DOCUMENTS

| | | |
|---|---|---|
| CN | 105744479 A | 7/2016 |
| EP | 2323115 A1 | 5/2011 |
| WO | 2018048913 A1 | 3/2018 |

OTHER PUBLICATIONS

International Search Report and Written Opinion of the International Searching Authority for PCT International Application No. PCT/CN2020/090655 dated Jan. 20, 2021.

Chinese Office Action, Chinese Patent Application No. 202080100933.1, mailed Dec. 26, 2024, 8 pages.

C-Roads, "C-ITS Infrastructure Functions and Specifications", C-Roads Platform, Working Group 2 Technical Aspects, Taskforce 3 Infrastructure Communication, May 27, 2019, 68 pages.

* cited by examiner

METHOD AND MANAGEMENT ENTITY FOR DETERMINATION OF GEOFENCE

CROSS-REFERENCE TO RELATED APPLICATION

This application is a 35 U.S.C. § 371 national stage application of PCT International Application No. PCT/CN2020/090655 filed on May 15, 2020, the disclosure and content of which is incorporated by reference herein in its entirety.

TECHNICAL FIELD

Embodiments of the disclosure generally relate to device management, and, more particularly, to a method and a management entity for determination of geofence.

BACKGROUND

This section introduces aspects that may facilitate better understanding of the present disclosure. Accordingly, the statements of this section are to be read in this light and are not to be understood as admissions about what is in the prior art or what is not in the prior art.

A geofence is a virtual perimeter for a real-world geographic area. A geofence could be dynamically generated or predefined. The use of a geofence is called geofencing. One example of usage involves a location-aware device of a location-based service (LBS) user entering or exiting a geofence. This activity could trigger an alert to the user of the device as well as messaging to the geofence operator. This information, which could contain the location of the device, could be sent to a mobile telephone or another system for further processing.

Geofencing is critical for connected vehicles. A lot of connected vehicle services rely on geofencing technology to implement. For example, in a use case for predefined geofence, the geofence can be an area of interest (AOI). When a vehicle drives into the geofence, connected vehicle system could send an advertisement message to the driver/passengers as customer engagement. In another use case for predefined geofence, the geofence can be a toll gate. When a vehicle drives into the geofence, connected vehicle system could trigger an automatic payment for the toll fee.

For dynamically generated geofence, it may be used for road hazard alerting, as an example. When a vehicle encounters road hazard situation, it could report the location to connected vehicle system and the latter will generate a geofence for the hazard area. If another vehicle drives into this geofence, it will receive an alerting message. Typical road hazard alerting scenarios include wildlife collision, aquaplaning, potholes, etc. Dynamically generated geofence may also apply to safety use cases of vehicle-to-everything (V2X). Since safety use cases are latency sensitive, besides vehicle-to-vehicle (V2V) technology, vehicle-to-network-to-vehicle (V2N2V) technology powered by the 5th generation (5G) and edge computing is also another option. In this V2N2V implementation, geofencing usually plays a very important role. A typical scenario of safety use cases of V2X is emergency electronic brake light (EEBL). When a vehicle brakes under an emergency, it will report this event and its location to the connected vehicle system and the latter will generate a geofence for the braked vehicle. If another vehicle is inside or drives into this geofence, it will receive an alerting message.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for determination of geofence. In particular, one of the problems to be solved by the disclosure is to avoid irrelevant receivers from being alerted due to a geofence.

According to a first aspect of the disclosure, there is provided a method performed by a management entity. The method comprises receiving, from an event reporter, a report indicating that an event related to a geofence has occurred at a location. The method further comprises determining, from a geographic information database, one or more spatial elements related to a spatial range of the geofence, with the reported location of the event. The method further comprises determining, from the one or more spatial elements, the spatial range of the geofence. At least one of determining the one or more spatial elements and determining the spatial range of the geofence is based on one or more event rules predetermined for the event according to characteristic of the event.

In this way, the coverage of the geofence can be optimized.

In an embodiment of the disclosure, the one or more event rules may be predetermined for the event according to an influence of the event on traffic condition.

In an embodiment of the disclosure, the spatial element may be one of a road segment, a road lane and a flight path.

In an embodiment of the disclosure, the one or more event rules may comprise at least one predetermined extending direction of the geofence relative to the location of the event.

In an embodiment of the disclosure, the at least one predetermined extending direction of the geofence may be one of: a first direction that is the same as a forward direction predefined for a corresponding spatial element; a second direction that is opposite to the first direction; and both the first direction and the second direction.

In an embodiment of the disclosure, the one or more event rules may comprise a predetermined level of areas related to the event.

In an embodiment of the disclosure, one or more road segments may be determined when the predetermined level of areas is road segment.

In an embodiment of the disclosure, one or more road lanes may be determined when the predetermined level of areas is road lane.

In an embodiment of the disclosure, the one or more event rules may comprise a predetermined time range. The spatial range of the geofence may be determined based on one or more speeds related to the one or more spatial elements, such that a length of time required by traveling through the spatial range of the geofence according to the one or more speeds is within the predetermined time range.

In an embodiment of the disclosure, the speed used for traveling on a spatial element may have a correspondence to that spatial element.

In an embodiment of the disclosure, the speed related to a spatial element may be one of: a real-time average speed of the spatial element; and a speed limit for the spatial element.

In an embodiment of the disclosure, the one or more event rules may comprise a predetermined event type to which the event belongs.

In an embodiment of the disclosure, the event reporter may be a moving entity or a stationary entity.

In an embodiment of the disclosure, the event reporter may be a moving entity and the one or more spatial elements may be determined based further on historical trajectory information of the event reporter.

In an embodiment of the disclosure, information about the one or more speeds related to the one or more spatial elements may be obtained from a real-time traffic information provider or the geographic information database.

According to a second aspect of the disclosure, there is provided a management entity. The management entity comprises at least one processor and at least one memory. The at least one memory contains instructions executable by the at least one processor, whereby the management entity is operative to receive, from an event reporter, a report indicating that an event related to a geofence has occurred at a location. The management entity is further operative to determine, from a geographic information database, one or more spatial elements related to a spatial range of the geofence, with the reported location of the event. The management entity is further operative to determine, from the one or more spatial elements, the spatial range of the geofence. At least one of determining the one or more spatial elements and determining the spatial range of the geofence is based on one or more event rules predetermined for the event according to characteristic of the event.

In an embodiment of the disclosure, the one or more event rules may be predetermined for the event according to an influence of the event on traffic condition.

In an embodiment of the disclosure, the spatial element may be one of a road segment, a road lane and a flight path.

In an embodiment of the disclosure, the one or more event rules may comprise at least one predetermined extending direction of the geofence relative to the location of the event.

In an embodiment of the disclosure, the at least one predetermined extending direction of the geofence may be one of: a first direction that is the same as a forward direction predefined for a corresponding spatial element; a second direction that is opposite to the first direction; and both the first direction and the second direction.

In an embodiment of the disclosure, the one or more event rules may comprise a predetermined level of areas related to the event.

In an embodiment of the disclosure, one or more road segments may be determined when the predetermined level of areas is road segment.

In an embodiment of the disclosure, one or more road lanes may be determined when the predetermined level of areas is road lane.

In an embodiment of the disclosure, the one or more event rules may comprise a predetermined time range. The management entity may be operative to determine the spatial range of the geofence based on one or more speeds related to the one or more spatial elements, such that a length of time required by traveling through the spatial range of the geofence according to the one or more speeds is within the predetermined time range.

In an embodiment of the disclosure, the speed used for traveling on a spatial element may have a correspondence to that spatial element.

In an embodiment of the disclosure, the speed related to a spatial element may be one of: a real-time average speed of the spatial element; and a speed limit for the spatial element.

In an embodiment of the disclosure, the one or more event rules may comprise a predetermined event type to which the event belongs.

In an embodiment of the disclosure, the event reporter may be a moving entity or a stationary entity.

In an embodiment of the disclosure, the event reporter may be a moving entity and the management entity may be operative to determine the one or more spatial elements based further on historical trajectory information of the event reporter.

In an embodiment of the disclosure, information about the one or more speeds related to the one or more spatial elements may be obtained from a real-time traffic information provider or the geographic information database.

According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided a management entity. The management entity comprises a reception module for receiving, from an event reporter, a report indicating that an event related to a geofence has occurred at a location. The management entity further comprises a first determination module for determining, from a geographic information database, one or more spatial elements related to a spatial range of the geofence, with the reported location of the event. The management entity further comprises a second determination module for determining, from the one or more spatial elements, the spatial range of the geofence. At least one of determining the one or more spatial elements and determining the spatial range of the geofence is based on one or more event rules predetermined for the event according to characteristic of the event

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
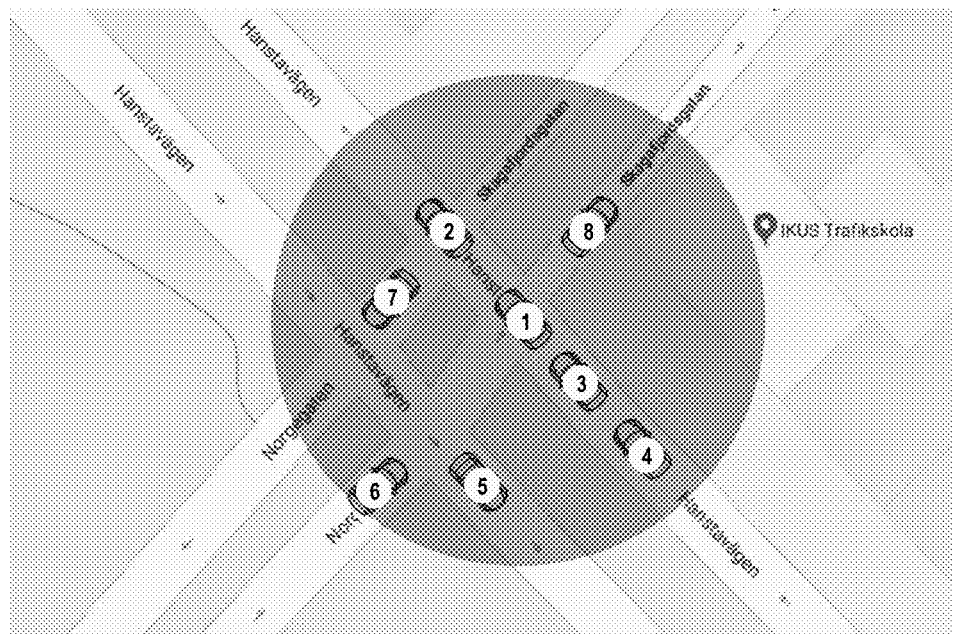
FIG. 1 is a diagram illustrating an existing geofence.

Currently, for dynamically generated geofence for connected vehicles, regular graphics are commonly used, e.g. a circle with variable radius. FIG. 1 illustrates such a geofence in an EEBL case. Suppose vehicle 1 is the braked one and a simple circle geofence is used. Then, all vehicles 2-8 will receive alerts.

However, considering the road/lane topology and the nature of EEBL case, only vehicle 3, 4 and 6 shall be alerted. Vehicle 2 is in the same lane as the braked vehicle but is ahead of it, so there is no impact on vehicle 2. Vehicle 5 is not in the same lane as the braked vehicle, so there is no impact on vehicle 5. Vehicle 7 is not in the same road as the braked vehicle, so there is no impact on vehicle 7. Vehicle 8 is in the road intersected with the road where vehicle 1 braked, but is ahead of vehicle 1, so there is no impact on vehicle 8.

In addition, the radius of the circle is static or based on preconfigured rules without considering current traffic situation. Thus, it is not optimized.

Based on the above, the geofence in regular shape has the following drawbacks. Firstly, since actual geographical information (such as road/lane topology, road/lane direction) and current traffic information is not considered, the coverage is not optimized so that irrelevant vehicles may be alerted. Secondly, considering enormous number of connected vehicles and the V2X vision, connected vehicle system will have to generate a huge number of unnecessary messages to irrelevant vehicles, which is a significant waste. Thirdly, from the point of view of an individual vehicle, it may receive a lot of alerts which are not relevant to itself. The vehicle has to implement extra logic and spend extra computation resource to determine if those events are relevant or not.

The present disclosure proposes an improved solution for determination of geofence. Hereinafter, the solution will be described in detail with reference to FIGS. 2-14.

Figure 2:
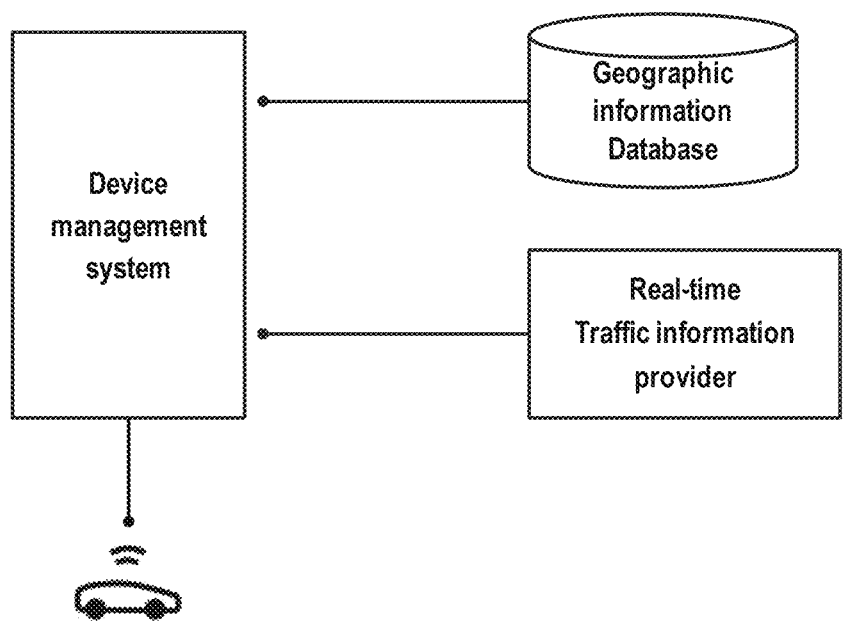
FIG. 2 is a diagram illustrating an exemplary architecture into which an embodiment of the disclosure is applicable.

FIG. 2 is a diagram illustrating an exemplary architecture into which an embodiment of the disclosure is applicable. As shown, the exemplary architecture comprises a device management system, a geographic information database and a real-time traffic information provider. Although the device managed by the device management system is shown in FIG. 2 as a vehicle, the device may also be an aircraft (e.g. an unmanned aerial vehicle simply referred to as UAV), a watercraft (e.g. in an aquatic city), or other possible transportation means. The device can have a network connectivity that communicates bidirectionally with other systems outside the device. Typically, the device may send telemetry data or events, and receive commands or notifications. Although only one vehicle is shown in FIG. 2, the number of the devices may be more than one.

The device management system is a platform which can provide a set of services to connected devices, such as telematics service, infotainment service, geofencing service, remote diagnostic service, etc. For the case where the devices are vehicles, the device management system may be a vehicle connected system. Any existing or future developed Internet of vehicles (IoV) platform may be used as the vehicle connected system. For other cases of the devices, a similar platform may be used as the device management system. The connected devices can communicate with the device management system through network connectivity in order to access those services.

The geographic information database is a database which can be configured or optimized for storing and querying data that represents objects defined in a geometric space. For example, in the case where the devices are vehicles, the spatial objects may include point-of-interest and road network, etc. In terms of road network model, it may contain sub-objects such as lane and intersection, and related attributes for instance direction and speed. As an exemplary example, the geographic information database may be a geographic information system (GIS) spatial database.

The real-time traffic information provider is service provider which can provide real-time traffic information (or data) service to expose real-time traffic information (or data) to applications. For example, the service may be accessed via application programming interface (API) calls. Examples of information provided by the service may include, but not limited to, average speed of a lane, road obstacles, traffic incidents, etc. As described later, the real-time traffic information provider may not be needed in some embodiments. So it may be an optional component of the architecture.

Figure 3:
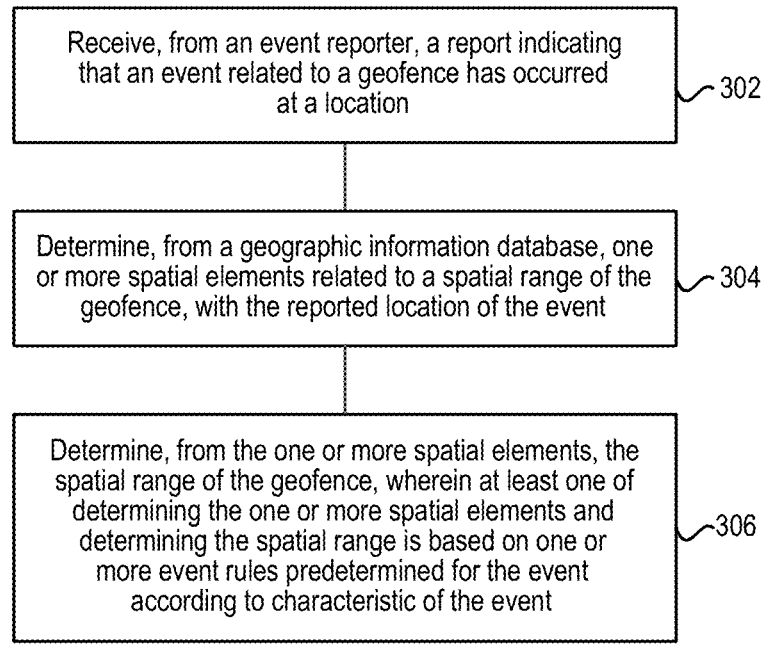
FIG. 3 is a flowchart illustrating a method performed by a management entity according to an embodiment of the disclosure.

FIG. 3 is a flowchart illustrating a method performed by a management entity according to an embodiment of the disclosure. The management entity may be a device management system shown in FIG. 2 or a component thereof. The management entity may be implemented either as a dedicated hardware, as a software instance running on a dedicated hardware, or as a virtualized function instantiated on an appropriate platform, e.g. on a cloud infrastructure. At block 302, the management entity receives, from an event reporter, a report indicating that an event related to a geofence has occurred at a location. The event reporter may be a moving entity or a stationary entity. In the case where the devices are vehicles, examples of the event reporter may include, but not limited to, a vehicle involved in the event (e.g. a braked vehicle in the scenario of EEBL, a vehicle encountering wildlife in the scenario of wildlife collision), an Internet of things (IoT) device (e.g. a roadside weather sensor), a terminal device of a user, etc. The roadside weather sensor can send a report to the management entity when detecting a dangerous weather or environment condition. Then a geofence can be generated by the management entity to alert related vehicles in advance. In the case where the devices are aircrafts, the event reporter may be a core network connected with a base station that cannot control UAVs due to the busy cell, which will be described later. The case where the devices are watercrafts is similar to the case of vehicles, so the cases of vehicles and aircrafts will be mainly described hereinafter.

The event related to a geofence may be an event predetermined in the management entity to trigger the generation of the geofence. Examples of the event may include, but not limited to, EEBL, wildlife collision, the busy cell failing to control UAVs, aquaplaning, potholes, traffic accident, etc. The location of the event may be determined and reported by the event reporter. For example, in the above case of vehicles, the location of the event may be detected by, for example, a vehicle involved in the event, an IoT device, a terminal device of a user, etc. In the above case of aircrafts, the location of the event may be a specific area determined as the coordinates of the busy cell and the radius of the cell coverage. The report may contain identification information of the event (e.g. a predetermined event type to which the event belongs) and information about the location of the event.

At block 304, the management entity determines, from a geographic information database, one or more spatial elements related to a spatial range of the geofence, with the reported location of the event. As mentioned above, the geographic information database may be a GIS spatial database. For the case of vehicles, the spatial element may be a road segment or a road lane (or simply referred to as a lane). The road segment is a section of a road. The lane is a part of a road segment and has a predefined forward direction to control and guide drivers and reduce traffic conflicts. For the case of aircrafts, the spatial element may be a flight path. At block 306, the management entity determines, from the one or more spatial elements, the spatial range of the geofence. At least one of determining the one or more spatial elements at block 304 and determining the spatial range of the geofence at block 306 is based on one or more event rules predetermined for the event according to characteristic of the event. Since the characteristic of the event is considered, the coverage of the geofence can be optimized.

One important characteristic of the event may be an influence of the event on traffic condition. For example, the level of areas related to or influenced by some events (e.g. EEBL) is lane, while the level of areas related to or influenced by some events (e.g. wildlife collision) is road segment. Accordingly, as a first option, the one or more event rules may comprise a predetermined level of areas related to the event. The one or more spatial elements may be determined at block 304 based on the predetermined level of areas related to the event. For instance, when the predetermined level of areas is road segment (e.g. for wildlife collision), one or more road segments may be determined at block 304. When the predetermined level of areas is road lane (e.g. for EEBL), one or more road lanes may be determined at block 304. In this way, the geofence coverage can be optimized by maximizing the targeting to relevant vehicles and minimizing the targeting to irrelevant vehicles. Further, the management entity can be offloaded from generating irrelevant messages. In turn, the (e.g. cellular) network connecting the management entity and devices can be offloaded from delivering the irrelevant messages. The individual devices can also be offloaded from processing the irrelevant messages.

As another example, some events (e.g. EEBL) only influence traffic condition after (or behind) the location of the event, while some events (e.g. wildlife collision) influence traffic condition before (or in front of) and after (or behind) the location of the event. Accordingly, as a second option, the one or more event rules may comprise at least one predetermined extending direction of the geofence relative to the location of the event. The one or more spatial elements may be determined at block 304 based on the at least one predetermined extending direction of the geofence.

For instance, the at least one predetermined extending direction of the geofence may be one of: a first direction that is the same as a forward direction predefined for a corresponding spatial element; a second direction that is opposite to the first direction; and both the first direction and the second direction. Then, the predetermined extending direction(s) of the geofence for EEBL may be the second direction, while the predetermined extending direction(s) of the geofence for wildlife collision may be both the first direction and the second direction.

Figure 4:
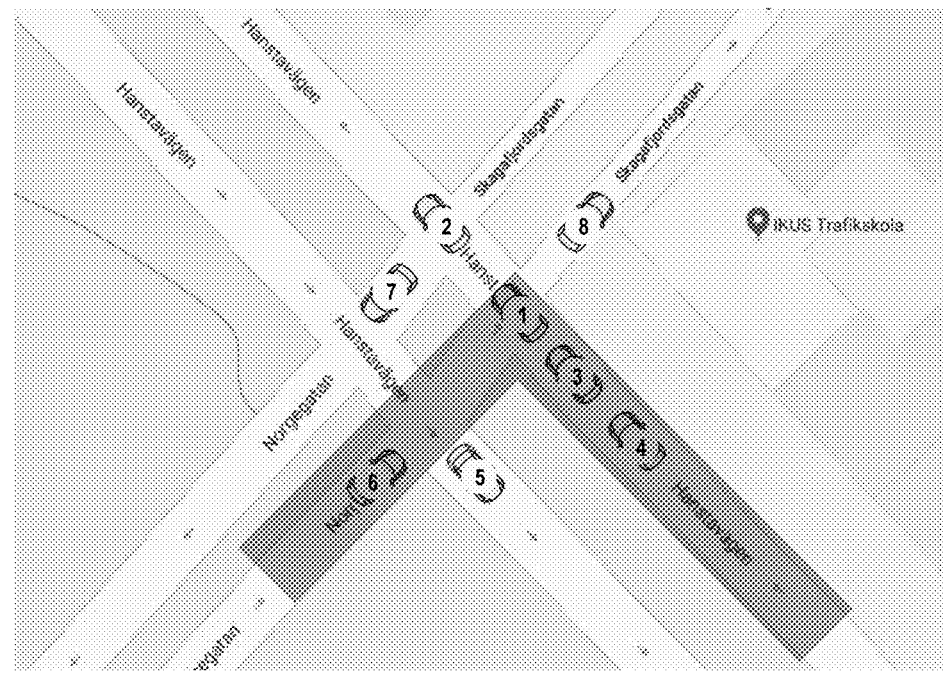
FIG. 4 is a diagram illustrating a geofence generated according to an embodiment of the disclosure.

For the EEBL scenario shown in FIG. 1, the braked vehicle 1 is located at an intersection. Based on the predetermined extending direction(s) of the geofence for EEBL, the geofence should extend from the intersection towards the bottom right corner and towards the bottom left corner, as shown in FIG. 4. In this way, the geofence coverage can be optimized by maximizing the targeting to relevant vehicles (vehicles 3, 4 and 6 in FIG. 4) and minimizing the targeting to irrelevant vehicles (vehicles 2, 5, 7 and 8 in FIG. 4). Further, as described above, the management entity, the network and the individual devices can be offloaded from unnecessary burden.

As yet another example, with respect to the size of the geofence area, if the road/lane is a highway, the geofence area shall be bigger than that for a normal road. Even for a specific road, the geofence area could be smaller during traffic jam period. In view of this, as a third option, the one or more event rules may comprise a predetermined time range for representing the size of the geofence area. The spatial range of the geofence may be determined at block 306 based on one or more speeds related to the one or more spatial elements, such that a length of time required by traveling through the spatial range of the geofence according to the one or more speeds is within the predetermined time range. Since speed information is considered, the geofence coverage can be optimized by maximizing the targeting to relevant vehicles and minimizing the targeting to irrelevant vehicles. Further, as described above, the management entity, the network and the individual devices can be offloaded from unnecessary burden.

The speed related to a spatial element may be a real-time average speed of the spatial element or a speed limit for the spatial element. Information about the real-time average speed may be obtained from a real-time traffic information provider. Information about the speed limit may be obtained from the geographic information database or the real-time traffic information provider. Thus, it is possible that the real-time traffic information provider may be an optional component when only the speed limit is used. The speed used for traveling on a spatial element has a correspondence to that spatial element. For example, when traveling on one of the one or more spatial elements, a corresponding one of the one or more speeds is used.

To identify the one or more event rules corresponding to an event, the one or more event rules may comprise a predetermined event type to which the event belongs. Examples of the event type include, but not limited to, EEBL, wildlife collision, busy cell failing to control UAVs, aquaplaning, potholes, traffic accident, etc. Different event types may have same or different predetermined event rules depending on the characteristics of related events.

Based on the above description, there may be three examples for implementing blocks 304 and 306. In the first example, the one or more spatial elements may be determined at block 304 based on the predetermined level of areas related to the event, and/or the at least one predetermined extending direction of the geofence. The spatial range of the geofence may be determined at block 306 by simply using a predetermined extending distance of the geofence. In the second example, block 304 may be implemented by simply querying the geographic information database for one or more spatial elements within a predetermined radius around the location of the event. The spatial range of the geofence may be determined at block 306 based on one or more speeds related to the one or more spatial elements and the predetermined time range. In the third example, the one or more spatial elements may be determined at block 304 based on the predetermined level of areas related to the event, and/or the at least one predetermined extending direction of the geofence. The spatial range of the geofence may be determined at block 306 based on one or more speeds related to the one or more spatial elements and the predetermined time range.

Figure 5:
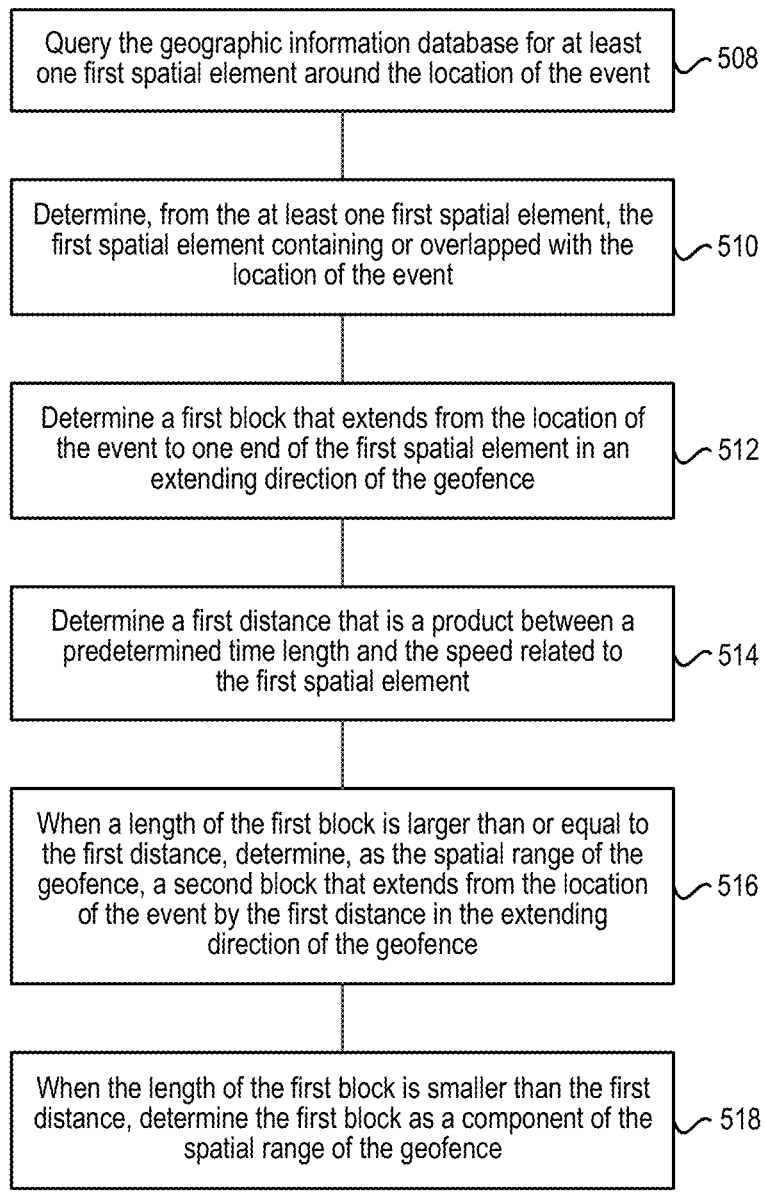
FIG. 5 is a flowchart for explaining the method of FIG. 3.

FIG. 5 is a flowchart for explaining the method of FIG. 3. Block 304 of FIG. 3 may be implemented as blocks 508-510 of FIG. 5 and block 306 of FIG. 3 may be implemented as blocks 512-518 of FIG. 5. At block 508, the management entity queries the geographic information database for at least one first spatial element around the location of the event. For example, at least one first spatial element within a predetermined radius around the location of the event may be queried. Block 508 may be performed based on the predetermined level of areas related to the event. At block 510, the management entity determines, from the at least one first spatial element, the first spatial element containing or overlapped with the location of the event. For example, for the scenario of EEBL, the first spatial element containing the location of the event may be determined. For the scenario of the busy cell failing to control UAVs, the first spatial element overlapped with the location of the event may be determined. When more than one first spatial elements are queried and the event reporter is a moving entity, the first spatial element may be determined based on historical trajectory information of the event reporter. For example, the event reporter may periodically report its location to the management entity such that its historical trajectory information can be maintained. Note that since the location of the event may be at an intersection of two roads/lanes, more than one first spatial elements may be determined at block 510.

At block 512, the management entity determines a first block that extends from the location of the event to one end of the first spatial element in an extending direction of the geofence. The extending direction of the geofence may be at least one predetermined extending direction of the geofence. Since the number of the extending directions may be more than one, the number of the first blocks may be more than one. At block 514, the management entity determines a first distance that is a product between a predetermined time length and the speed related to the first spatial element. That is, in the embodiment of FIG. 5, the predetermined time length is used instead of the predetermined time range described above. If a length of the first block is larger than or equal to the first distance, the management entity determines, as the spatial range of the geofence, a second block that extends from the location of the event by the first distance in the extending direction of the geofence at block 516. In this case, the boundaries of the geofence area are determined and thus the process ends at block 516. On the other hand, if the length of the first block is smaller than the first distance, the management entity determines the first block as a component of the spatial range of the geofence at block 518. In this case, the method of FIG. 6 needs to be performed to continue the determination of the geofence.

Figure 6:
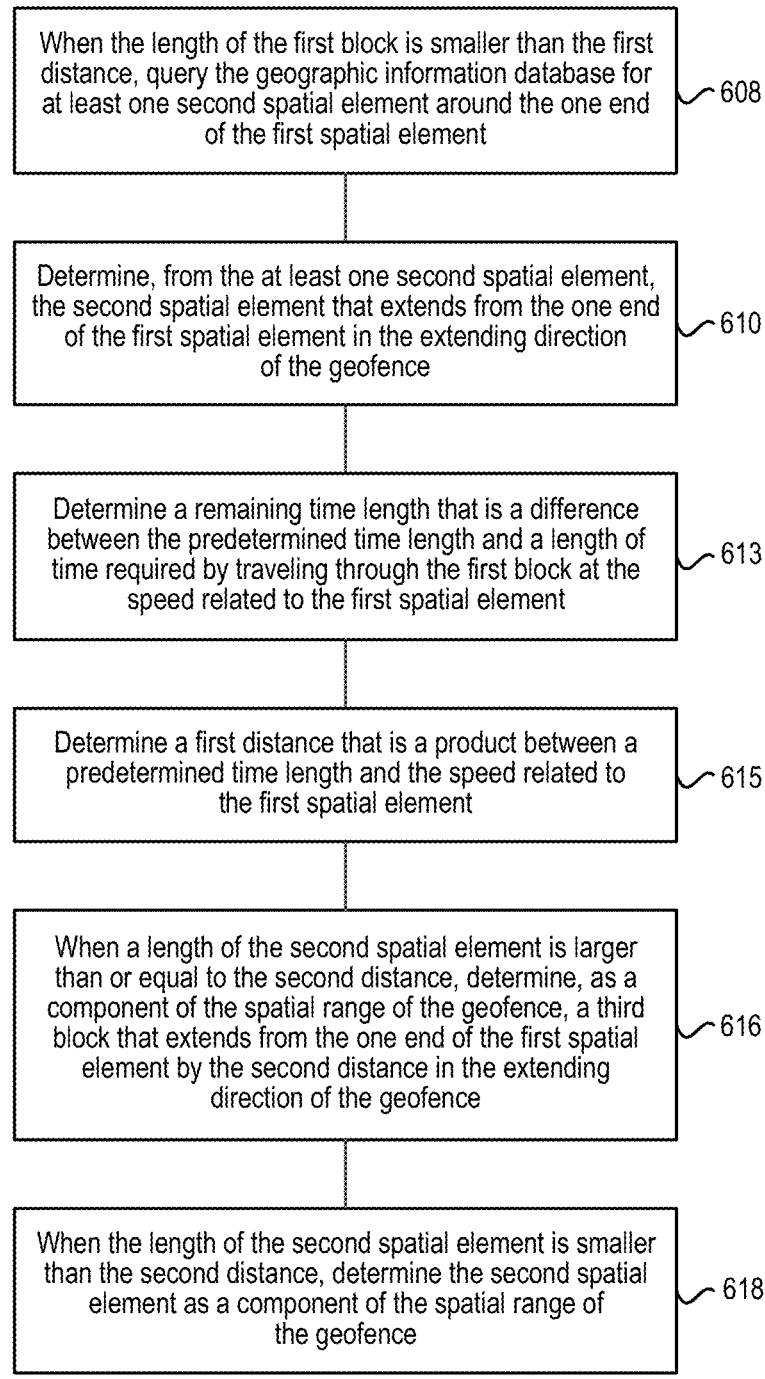
FIG. 6 is a flowchart for explaining the method of FIG. 3.

FIG. 6 is also a flowchart for explaining the method of FIG. 3. Block 304 of FIG. 3 may be implemented as blocks 608-610 of FIG. 6 and block 306 of FIG. 3 may be implemented as blocks 613, 615, 616 and 618 of FIG. 6. Continuing from block 518, if the length of the first block is smaller than the first distance, the management entity queries the geographic information database for at least one second spatial element around the one end of the first spatial element at block 608. For example, at least one second spatial element within a predetermined radius around the one end of the first spatial element may be queried. At block 610, the management entity determines, from the at least one second spatial element, the second spatial element that extends from the one end of the first spatial element in the extending direction of the geofence. Similarly, since the one end of the first spatial element may be an intersection between two roads/lanes, more than one second spatial elements may be determined at block 610.

At block 613, the management entity determines a remaining time length that is a difference between the predetermined time length and a length of time required by traveling through the first block at the speed related to the first spatial element. At block 615, the management entity determines a second distance that is a product between the remaining time length and the speed related to the second spatial element. If a length of the second spatial element is larger than or equal to the second distance, the management entity determines, as a component of the spatial range of the geofence, a third block that extends from the one end of the first spatial element by the second distance in the extending direction of the geofence at block 616. In this case, the boundaries of the geofence area are determined and thus the process ends at block 616. On the other hand, if the length of the second spatial element is smaller than the second distance, the management entity determines the second spatial element as a component of the spatial range of the geofence at block 618. In this case, the method of FIG. 7 needs to be performed to continue the determination of the geofence.

Figure 7:
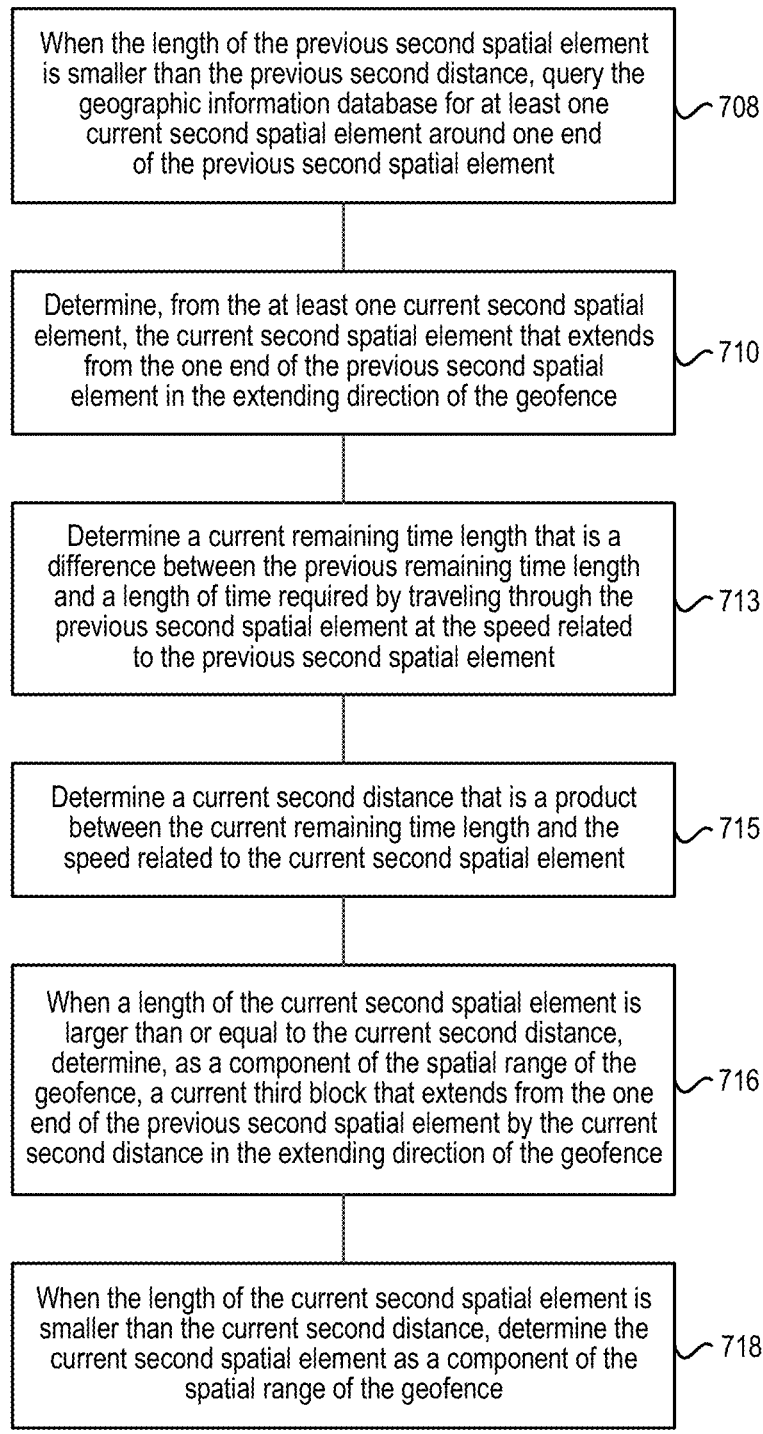
FIG. 7 is a flowchart for explaining the method of FIG. 3.

FIG. 7 is also a flowchart for explaining the method of FIG. 3. Block 304 of FIG. 3 may be implemented as blocks 708-710 of FIG. 7 and block 306 of FIG. 3 may be implemented as blocks 713, 715, 716 and 718 of FIG. 7. Continuing from block 618, if the length of the previous second spatial element is smaller than the previous second distance in the previous iteration, the management entity queries, in the current iteration, the geographic information database for at least one current second spatial element around one end of the previous second spatial element at block 708. Depending on the extending direction of the geofence, the one end of the previous second spatial element may be the start point or the end point of the previous second spatial element. For example, at least one current second spatial element within a predetermined radius around one end of the previous second spatial element may be queried. At block 710, the management entity determines, from the at least one current second spatial element, the current second spatial element that extends from the one end of the previous second spatial element in the extending direction of the geofence. Similarly, since the one end of the previous second spatial element may be an intersection between two roads/lanes, more than one current second spatial elements may be determined at block 710.

At block 713, the management entity determines a current remaining time length that is a difference between the previous remaining time length and a length of time required by traveling through the previous second spatial element at the speed related to the previous second spatial element. At block 715, the management entity determines a current second distance that is a product between the current remaining time length and the speed related to the current second spatial element. If a length of the current second spatial element is larger than or equal to the current second distance, the management entity determines, as a component of the spatial range of the geofence, a current third block that extends from the one end of the previous second spatial element by the current second distance in the extending direction of the geofence at block 716. In this case, the boundaries of the geofence area are determined and thus the process ends at block 716. On the other hand, if the length of the current second spatial element is smaller than the current second distance, the management entity determines the current second spatial element as a component of the spatial range of the geofence at block 718. In this case, the method of FIG. 7 needs to be performed again to continue the determination of the geofence until the process ends at block 716.

Figure 8:
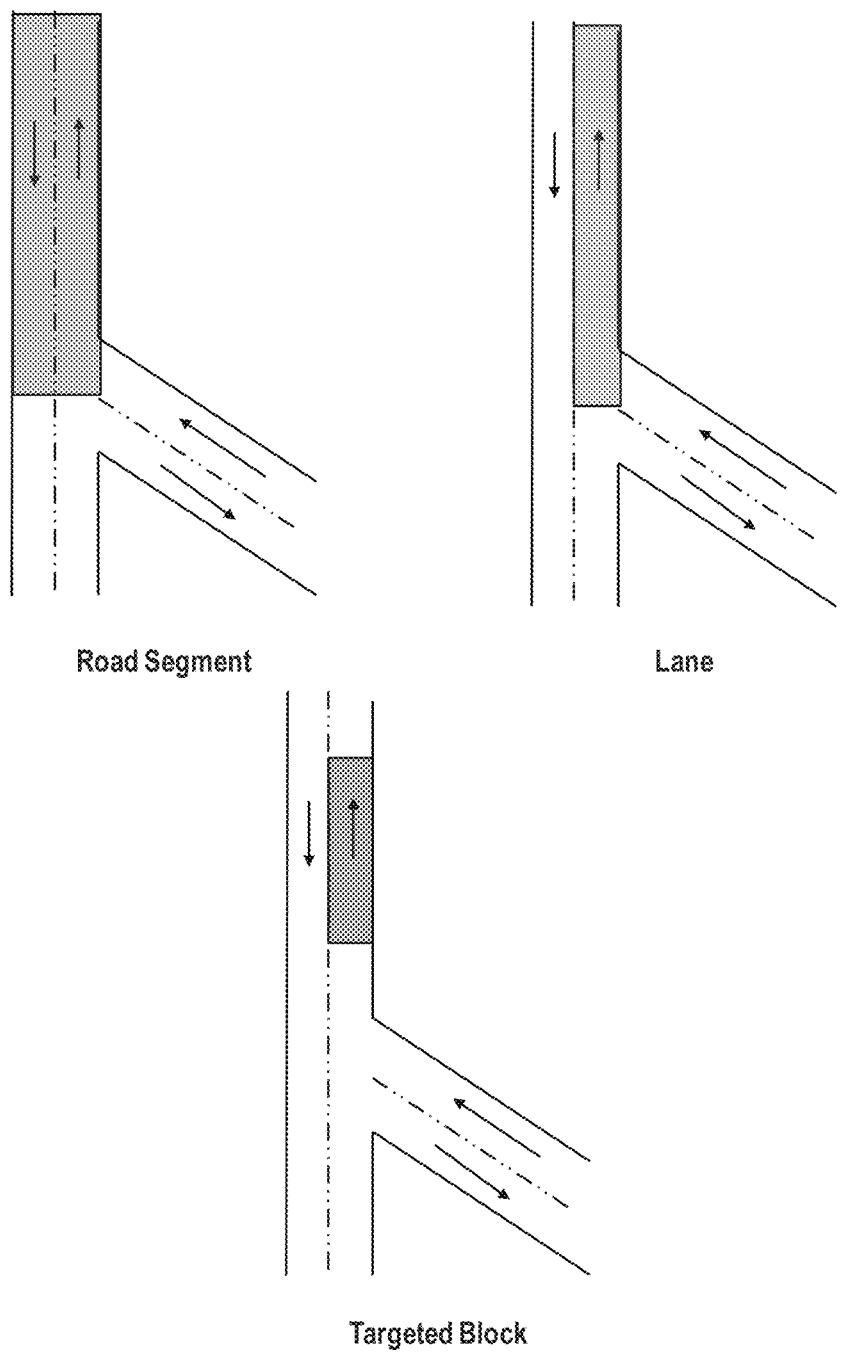
FIG. 8 is a diagram illustrating some concepts used in an exemplary process according to an embodiment of the disclosure.

FIG. 8 is a diagram illustrating some concepts used in an exemplary process according to an embodiment of the disclosure. As shown, the road segment is a specific section of a road with uniform characteristics that can be identified separately in a GIS spatial database. The lane is a part of a road segment that is designated to be used by a single line of vehicles, to control and guide drivers and reduce traffic conflicts. A lane can also be identified separately in a GIS spatial database. The targeted block is a segmentation of a lane that is part of a geofence for a specific type of event. Connected vehicle system can determine the targeted block inside a lane or road segment based on certain logic or algorithms which will be described later with respect to FIGS. 9-10.

As an exemplary example, the data structure for road segment may be as shown in the table below.

| Attribute | Data Type | Description |
| --- | --- | --- |
| roadId | Integer | The unique identity of the road segment. |
| length | Double | The length of the road segment. |
| width | Double | The width of the road segment. |
| geometry | Array (Line) | The geometry data in the road segment, typically are multiple lines |

As an exemplary example, the data structure for lane may be as shown in the table below.

| Attribute | Data Type | Description |
| --- | --- | --- |
| laneId | Integer | The unique identity of the lane. |
| roadId | Integer | The road segment this lane belongs to. |
| direction | Integer | 1: forward direction; −1: reverse direction. |
| width | Double | The width of the road segment. |
| speed | Double | The speed limit for the lane. |
| geometry | Array (Line) | The geometry data in the lane, typically are multiple lines |

As an exemplary example, the data structure for event rules may be as shown in the table below.

| Attribute | Data Type | Description |
| --- | --- | --- |
| eventType | Enum | Indicate the type of the event will trigger geofencing, e.g., EEBL. |
| relevanceArea | Enum | Indicate which level is relevant: ROADSEGMENT | LANE |
| relevanceDirection | Enum | Indicate which traffic direction is relevant. BEFORE | AFTER | BOTH |
| relevanceTime | Integer | In second. Indicate that the geofence shall notify vehicles will arrive at this event location maximally after relevanceTime. |

Note that the above tables only show main attributes and the present disclosure is not limited to the attributes in the tables.

Figure 9:
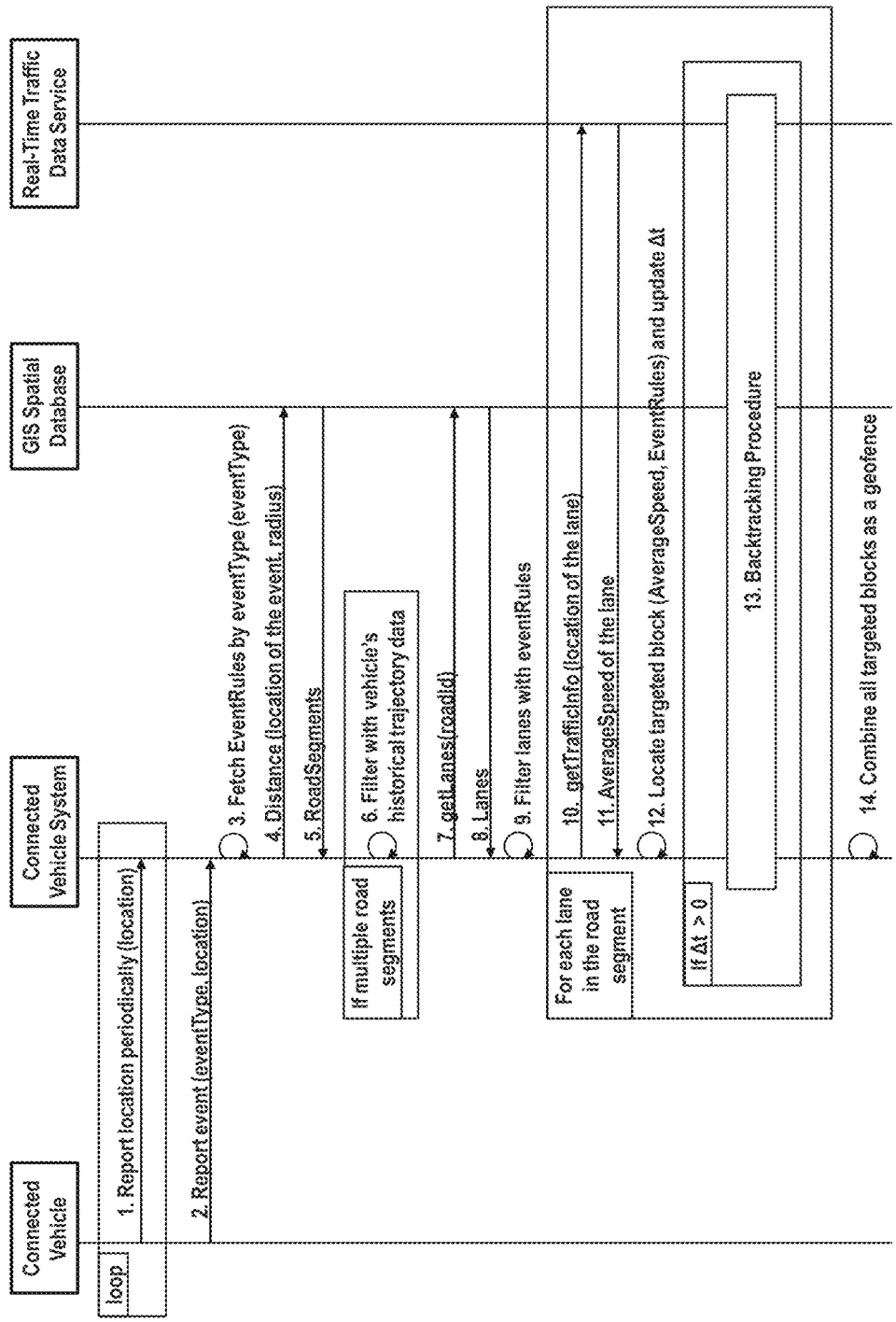
FIG. 9 is a flowchart illustrating an exemplary process according to an embodiment of the disclosure.

FIG. 9 is a flowchart illustrating an exemplary process according to an embodiment of the disclosure. In this exemplary process, the devices are vehicles, the device management system is a vehicle connected system, the geographic information database is a GIS spatial database, and a real-time traffic data service is used. This process shows the main procedure about how the connected vehicle system dynamically generates a geofence after receiving a notification of a relevant event.

At step 1, the connected vehicle reports its location to the connected vehicle system periodically. At step 2, at a certain point of time, the connected vehicle reports an event (e.g., EEBL event) with its location to the connected vehicle system. At step 3, the connected vehicle system fetches pre-configured eventRules by eventType. At step 4, the connected vehicle system calls 'Distance' method provided by the GIS spatial database to query the road segments relevant to the location of the event. The input parameters of the 'Distance' method are 'location' and 'radius'. At step 5, the GIS spatial database returns a result set. There may be one or multiple road segments inside the result set. If multiple road segments are returned by the GIS spatial database (for example, the vehicle is under an overpass), the connected vehicle system uses the historical trajectory data of the connected vehicle to do the filtering to get the most relevant road segment at step 6. At step 7, the connected vehicle system queries the lanes inside the selected road segment. The input parameter is 'roadId' which is the unique identity of the road segment. At step 8, the GIS spatial database returns a result set. There may be one or multiple lanes inside the result set. At step 9, the connected vehicle system uses eventRules to do lane filtering to get the relevant lanes.

Note that since the industry currently is actively seeking for an accurate positioning solution (2 cm) for V2X use cases (e.g. see Qualcomm and Trimble, https://enterpriseiotinsights.com/20190930/channels/news/qualcomm-seeks-accuracy-on-c-v2x), the implementation of high accuracy positioning system is feasible. The deployment of roadside sensor could also provide lane-level positioning capability for vehicles.

At step 10, for each relevant lane, the connected vehicle system calls the real-time traffic data service to get the real-time average speed of the lane by one of the locations inside the lane. At step 11, the real-time traffic data service returns the real-time averageSpeed of the lane. If no valid value is returned, the speed limit for the lane is used as averageSpeed instead. At step 12, the connected vehicle system locates the targeted block based on averageSpeed and eventRules. Specifically, the parameter relevanceDistance is calculated as:

relevanceDistance=averageSpeed*eventRules.relevanceTime.

If relevanceDistance is smaller than the length of the current targeted block, which means the current targeted block is enough, the remaining time length Δt is updated as zero: Δt=0. The process goes to step 14. If relevanceDistance is larger than the length of the current targeted block, which means the current targeted block is not enough, backtracking is needed. The remaining time length is updated as:

Δt=eventRules.relevanceTime−coveredTime, where coveredTime=length of current targeted block/averageSpeed. Then the process goes to step 13. At step 13, the connected vehicle system recursively executes the 'Backtracking Procedure' until Δt=0. At step 14, the connected vehicle system combines all targeted blocks as the geofence.

Figure 10:
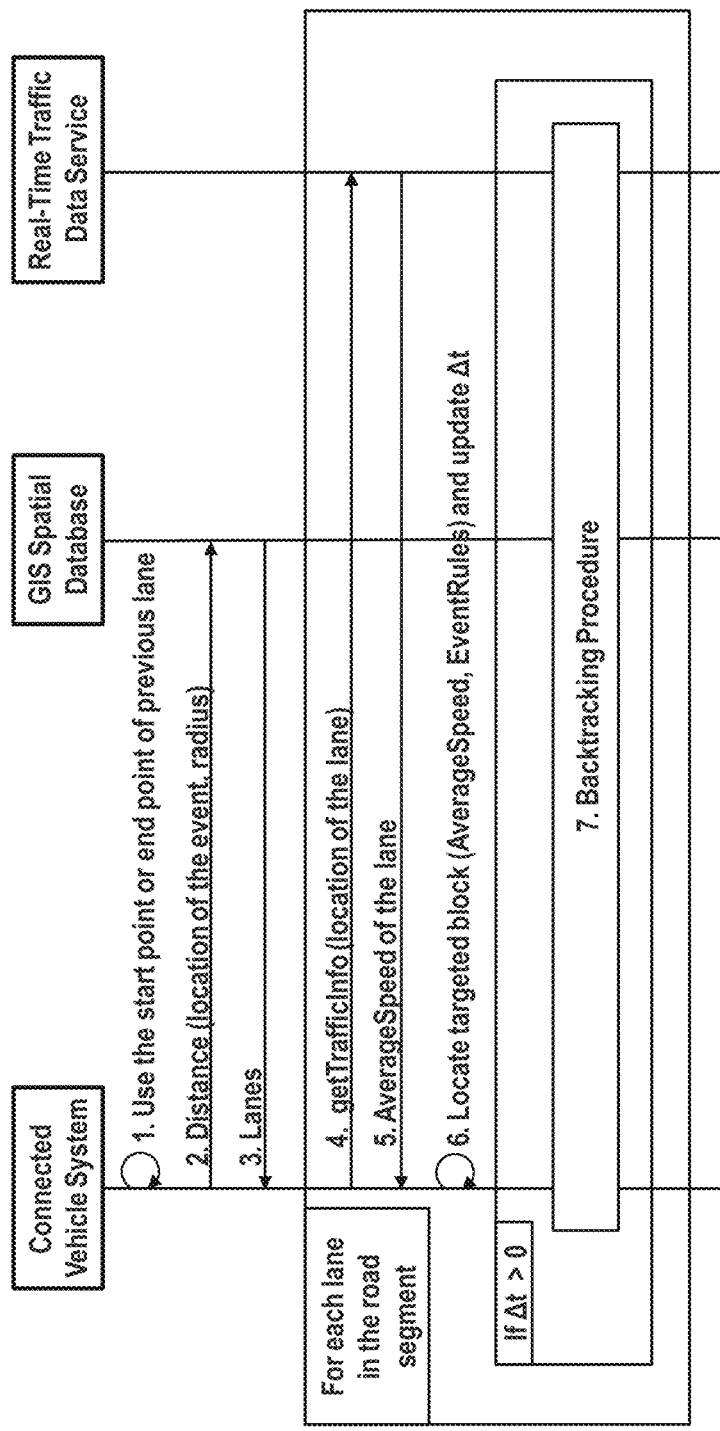
FIG. 10 is a flowchart illustrating an exemplary process according to an embodiment of the disclosure.

FIG. 10 is a flowchart illustrating the backtracking procedure. At step 1, the connected vehicle system uses either the start point or the end point of the previous lane as the location for further lane lookup, depending on the eventType. At step 2, the connected vehicle system calls 'Distance' method provided by the GIS spatial database to query the lanes connected with the previous lane. The input parameters of 'Distance' method are 'location' and 'radius'. At step 3, the GIS spatial database returns a result set. There may be one or multiple lanes inside the result set.

At step 4, for each relevant lane, the connected vehicle system calls the real-time traffic data service to get the real-time average speed of the lane by one of the locations inside the lane. At step 5, the real-time traffic data service returns the real-time average speed of the lane. If no valid value is returned, the speed limit for the lane is used as averageSpeed instead. At step 6, the connected vehicle system locates the targeted block based on averageSpeed and eventRules. Specifically, the parameter relevanceDistance is calculated as:

relevanceDistance=averageSpeed*Δt.

If relevanceDistance is smaller than the length of the current targeted block, which means the current targeted block is enough, the remaining time length is updated as zero: Δt=0. If relevanceDistance is larger than the length of the current targeted block, which means the current targeted block is not enough, backtracking is needed. The remaining time length is updated as:

Δt=Δt−coveredTime, where coveredTime=length of current targeted block/averageSpeed. Then the process goes to step 7. At step 7, the connected vehicle system recursively executes the Backtracking Procedure' until Δt=0.

Figure 11:
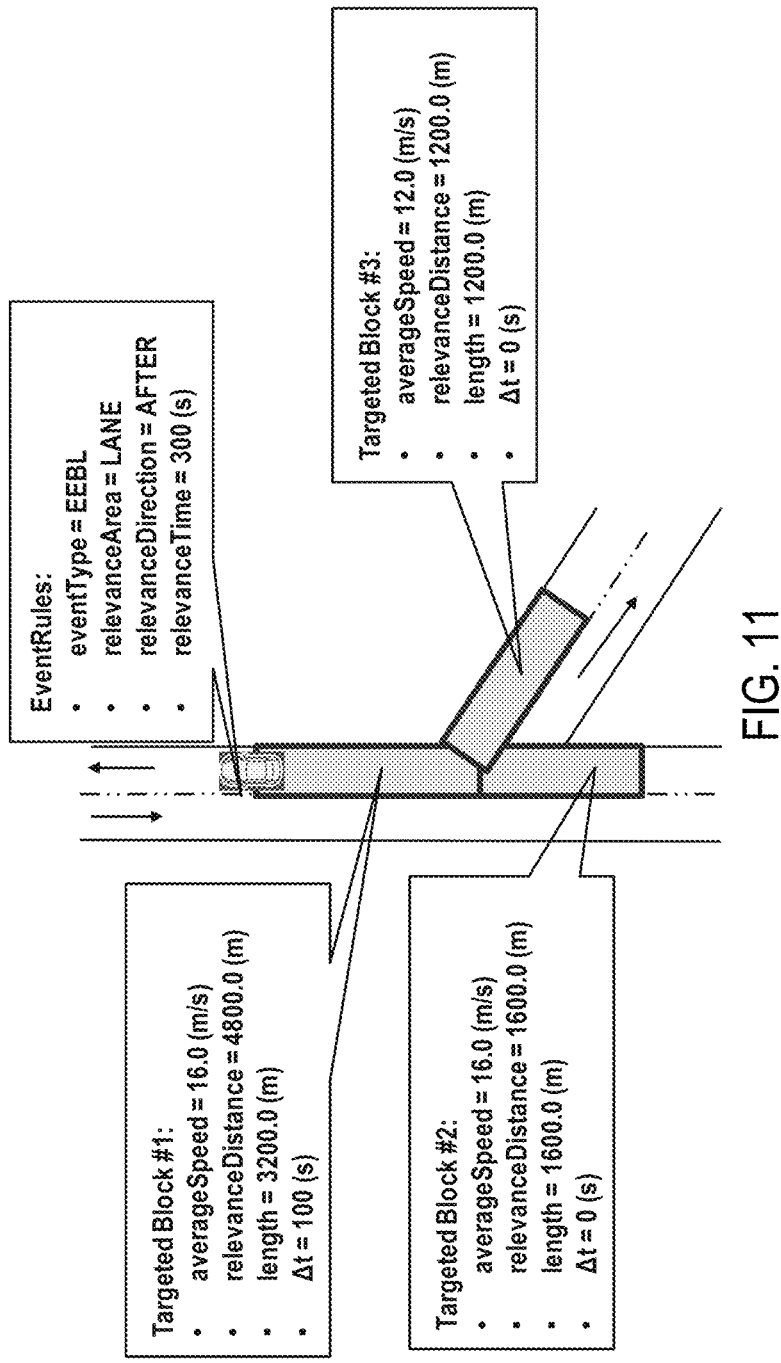
FIG. 11 is a diagram illustrating a geofence generated according to an embodiment of the disclosure.

FIG. 11 is a diagram illustrating a geofence generated according to an embodiment of the disclosure. As shown, in the event rules for this scenario, event type is EEBL, relevanceArea is LANE, relevanceDirection is AFTER, and relevanceTime is 300 seconds. Suppose the lane where the braked vehicle is located is lane #1. At first, the targeted block #1 is determined as extending from the location of the braked vehicle in a direction indicated by the relevanceDirection to the bottom end of lane #1. As shown, the length of the targeted block #1 is 3200 m, while the relevanceDistance=averageSpeed*relevanceTime=4800 m. Since the length of the targeted block #1 is smaller than the relevanceDistance, backtracking is needed. The remaining time length is updated as: Δt=relevanceTime−coveredTime=300−3200/16=10 seconds.

Suppose the lane extending downwards from the bottom end of lane #1 is lane #2 and the lane extending towards the bottom right corner from the bottom end of lane #1 is lane #3. Then, according to the relevanceDirection, lane #2 and lane #3 are determined for locating corresponding targeted blocks. Since the averageSpeed for lane #2 is 16 m/s, the relevanceDistance for lane #2 is 1600 m, which is smaller than the length of lane #2. Thus, the remaining time length is updated as zero. Since the averageSpeed for lane #3 is 12 m/s, the relevanceDistance for lane #3 is 1200 m, which is smaller than the length of lane #3. Thus, the remaining time length is also updated as zero. Then, the three targeted blocks are combined as the geofence for the EEBL scenario.

Figure 12:
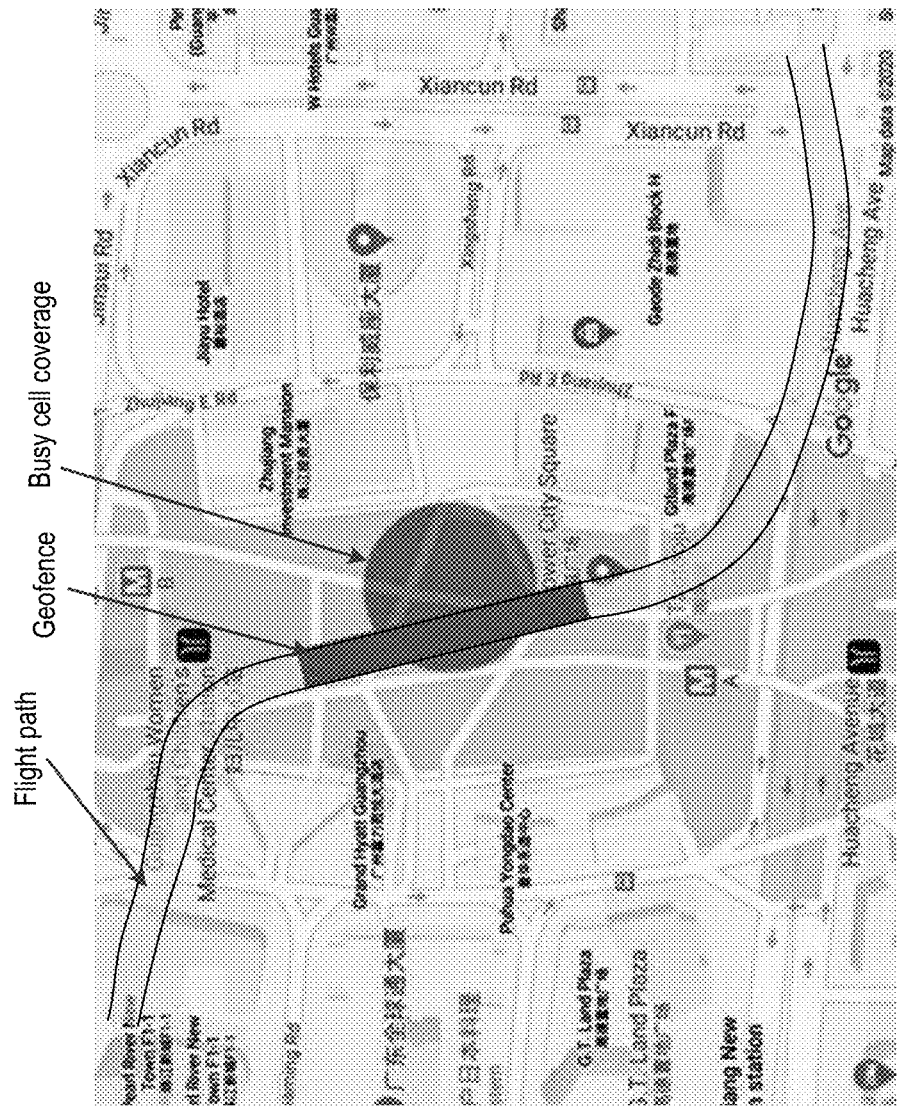
FIG. 12 is a diagram illustrating a geofence generated according to an embodiment of the disclosure.

FIG. 12 is a diagram illustrating a geofence generated according to an embodiment of the disclosure. In the scenario shown in FIG. 12, a UAV flies along the flight path and is controlled by a cellular network. The flight path can be queried from a corresponding GIS spatial database. As shown, one base station in the cellular network cannot control the UAV due to the busy cell. For this event, the overlapped portion between the flight path and the busy cell coverage may be determined as the location of the event. The core network connected with this base station may detect such event and report it to the device management system. Exemplary event rules for this event may be as shown in the table below.

| eventType | Enum | BUSY CELL |
| relevanceArea | Enum | FLIGTH PATH |
| relevanceDirection | Enum | BOTH |
| relevanceTime | Integer | XX seconds |

Based on the event rules, the overlapped portion extends along the flight path in two opposite directions by a certain distance calculated according to the relevanceTime, so as to form the spatial range of the geofence for the busy cell scenario. Any UAVs within the geofence may be alerted to change its flight path.

Figure 13:
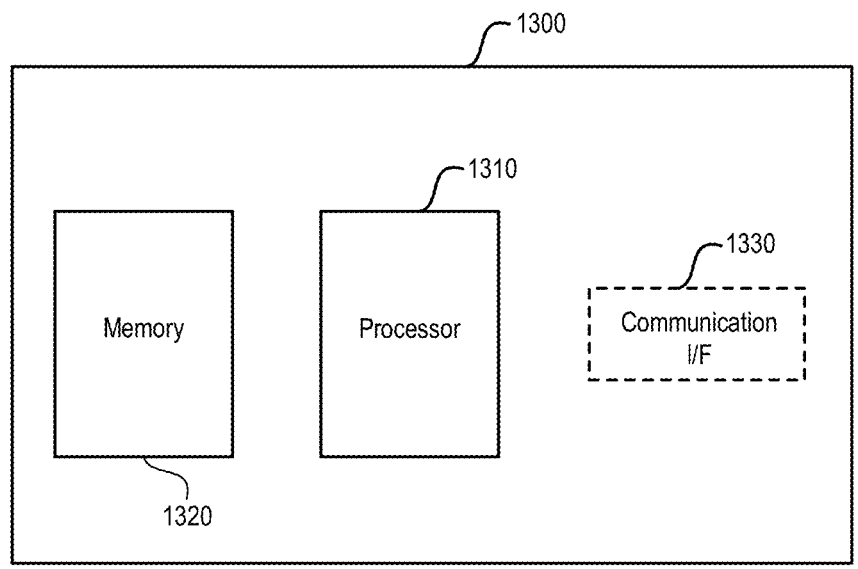
FIG. 13 is a block diagram showing an apparatus suitable for use in practicing some embodiments of the disclosure.

FIG. 13 is a block diagram showing an apparatus suitable for use in practicing some embodiments of the disclosure. For example, the management entity described above may be implemented through the apparatus 1300. As shown, the apparatus 1300 may include a processor 1310, a memory 1320 that stores a program, and optionally a communication interface 1330 for communicating data with other external devices through wired and/or wireless communication.

The program includes program instructions that, when executed by the processor 1310, enable the apparatus 1300 to operate in accordance with the embodiments of the present disclosure, as discussed above. That is, the embodiments of the present disclosure may be implemented at least in part by computer software executable by the processor 1310, or by hardware, or by a combination of software and hardware.

The memory 1320 may be of any type suitable to the local technical environment and may be implemented using any suitable data storage technology, such as semiconductor based memory devices, flash memories, magnetic memory devices and systems, optical memory devices and systems, fixed memories and removable memories. The processor 1310 may be of any type suitable to the local technical environment, and may include one or more of general purpose computers, special purpose computers, microprocessors, digital signal processors (DSPs) and processors based on multi-core processor architectures, as non-limiting examples.

Figure 14:
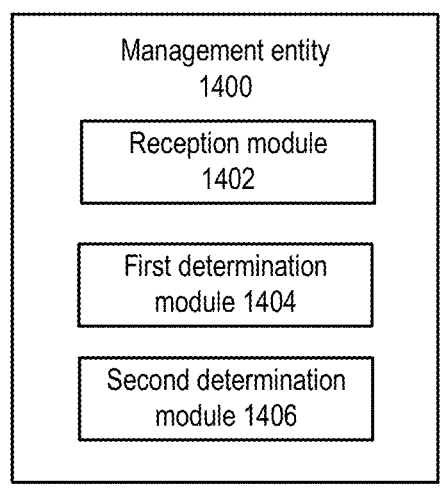
FIG. 14 is a block diagram showing a management entity according to an embodiment of the disclosure.

FIG. 14 is a block diagram showing a management entity according to an embodiment of the disclosure. As shown, the management entity 1400 comprises a reception module 1402, a first determination module 1404 and a second determination module 1406. The reception module 1402 may be configured to receive, from an event reporter, a report indicating that an event related to a geofence has occurred at a location, as described above with respect to block 302. The first determination module 1404 may be configured to determine, from a geographic information database, one or more spatial elements related to a spatial range of the geofence, with the reported location of the event, as described above with respect to block 304. The second determination module 1406 may be configured to determine, from the one or more spatial elements, the spatial range of the geofence, as described above with respect to block 306. At least one of determining the one or more spatial elements and determining the spatial range of the geofence is based on one or more event rules predetermined for the event according to characteristic of the event. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a management entity, comprising:
   receiving, from an event reporter, a report indicating that an event related to a geofence has occurred at a location;
   determining, from a geographic information database, one or more spatial elements related to a spatial range of the geofence, with the reported location of the event; and
   determining, from the one or more spatial elements, the spatial range of the geofence;
   wherein at least one of determining the one or more spatial elements and determining the spatial range of the geofence is based on one or more event rules predetermined for the event according to characteristic of the event, wherein the one or more event rules comprise a predetermined time range; and wherein the spatial range of the geofence is determined based on one or more speeds related to the one or more spatial elements, such that a length of time required by traveling through the spatial range of the geofence according to the one or more speeds is within the predetermined time range.

2. The method according to claim 1, wherein the one or more event rules are predetermined for the event according to an influence of the event on traffic condition.

3. The method according to claim 1, wherein the one or more spatial elements is one of:
a road segment; a road lane; and a flight path.

4. The method according to claim 1, wherein the one or more event rules comprise at least one predetermined extending direction of the geofence relative to the location of the event.

5. The method according to claim 1, wherein the one or more event rules comprise a predetermined level of areas related to the event.

6. The method according to claim 5, wherein one or more road segments are determined when the predetermined level of areas is a road segment; or
wherein one or more road lanes are determined when the predetermined level of areas is a road lane.

7. The method according to claim 1, wherein the speed used for traveling on a spatial element has a correspondence to that spatial element.

8. The method according to claim 1, wherein the speed related to a spatial element is one of:
a real-time average speed of the spatial element; and
a speed limit for the spatial element.

9. The method according to claim 1, wherein the one or more event rules comprise a predetermined event type to which the event belongs.

10. The method according to claim 1, wherein the event reporter is a moving entity or a stationary entity.

11. The method according to claim 10, wherein the event reporter is a moving entity and the one or more spatial elements are determined based further on historical trajectory information of the event reporter.

12. The method according to claim 1, wherein information about the one or more speeds related to the one or more spatial elements is obtained from a real-time traffic information provider or the geographic information database.

13. A method performed by a management entity, comprising:
receiving, from an event reporter, a report indicating that an event related to a geofence has occurred at a location;
determining, from a geographic information database, one or more spatial elements related to a spatial range of the geofence, with the reported location of the event; and
determining, from the one or more spatial elements, the spatial range of the geofence;
wherein at least one of determining the one or more spatial elements and determining the spatial range of the geofence is based on one or more event rules predetermined for the event according to characteristic of the event, wherein the one or more event rules comprise at least one predetermined extending direction of the geofence relative to the location of the event, wherein the at least one predetermined extending direction of the geofence is one of:
a first direction that is the same as a forward direction predefined for a corresponding spatial element;
a second direction that is opposite to the first direction; and
both the first direction and the second direction.

14. A management entity comprising:
at least one processor; and
at least one memory, the at least one memory containing instructions executable by the at least one processor, whereby the management entity is operative to:
receive, from an event reporter, a report indicating that an event related to a geofence has occurred at a location;
determine, from a geographic information database, one or more spatial elements related to a spatial range of the geofence, with the reported location of the event; and
determine, from the one or more spatial elements, the spatial range of the geofence;
wherein at least one of determining the one or more spatial elements and determining the spatial range of the geofence is based on one or more event rules predetermined for the event according to characteristic of the event, wherein the one or more event rules comprise a predetermined time range; and
wherein the spatial range of the geofence is determined based on one or more speeds related to the one or more spatial elements, such that a length of time required by traveling through the spatial range of the geofence according to the one or more speeds is within the predetermined time range.

15. The management entity according to claim 14, wherein the one or more event rules are predetermined for the event according to an influence of the event on traffic condition.

16. The management entity according to claim 14, wherein the one or more spatial elements is one of:
a road segment; a road lane; and a flight path.

17. The management entity according to claim 14, wherein the one or more event rules comprise at least one predetermined extending direction of the geofence relative to the location of the event.

18. A management entity comprising:
at least one processor; and
at least one memory, the at least one memory containing instructions executable by the at least one processor, whereby the management entity is operative to:
receive, from an event reporter, a report indicating that an event related to a geofence has occurred at a location;
determine, from a geographic information database, one or more spatial elements related to a spatial range of the geofence, with the reported location of the event; and
determine, from the one or more spatial elements, the spatial range of the geofence;
wherein at least one of determining the one or more spatial elements and determining the spatial range of the geofence is based on one or more event rules predetermined for the event according to characteristic of the event, wherein the one or more event rules comprise at least one predetermined extending direction of the geofence relative to the location of the event, wherein the at least one predetermined extending direction of the geofence is one of:
a first direction that is the same as a forward direction predefined for a corresponding spatial element;
a second direction that is opposite to the first direction; and
both the first direction and the second direction.

19. The management entity according to claim 14, wherein the one or more event rules comprise a predetermined level of areas related to the event.

* * * * *